United States Patent Office 3,786,050
Patented Jan. 15, 1974

3,786,050
DIPHENYL SULFONES
Tsung-Ying Shen, Westfield, William V. Ruyle, Scotch Plains, Michael W. Fordice, Cranford, and Norman P. Jensen, Watchung, N.J., assignors to Merck & Co., Inc., Rahway, N.J.
No Drawing. Continuation-in-part of application Ser. No. 73,245, Sept. 17, 1970. This application July 6, 1971, Ser. No. 160,158
Int. Cl. C07c *147/12*
U.S. Cl. 260—239.6
7 Claims

ABSTRACT OF THE DISCLOSURE

New substituted diphenyl sulfones useful in reducing mortality and decreasing lesion incidence of poultry exposed to Marek's disease are disclosed.

This application is a continuation-in-part of Ser. No. 73,245, filed Sept. 17, 1970.

ABSTRACT OF THE INVENTION

New substituted diphenyl sulfones of the following formula:

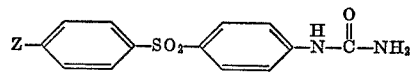

wherein Z is a substituted amino moiety having the following structure:

  (I)

  (II)

wherein $R_1$ is a phenyl group, optionally substituted with chloro; hydroxy and loweralkoxy; or hydroxy and chloro; or with a 3,4-methylenedioxy substituent; or a heterocyclic 5–6 membered ring containing one hetero atom selected from the group consisting of O, N, or S; $R_2$ is cycloalkyl having 3–6 carbon atoms, trifluoromethyl, chloromethyl, a heterocyclic 5–6 membered ring containing one hetero atom selected from the group consisting of O or N, or an aminohydrocarbyl fragment selected from the group consisting of aminomethyl, 1-amino-2-phenylethyl, and 1-amino-2-carboxyethyl; $R_2$ is also 2-carboxyethyl; and Z is also

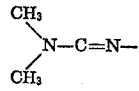  (III)

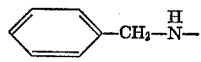  (IV)

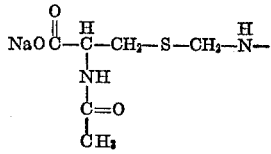  (V)

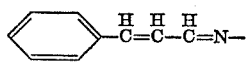  (VI)

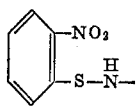  (VII)

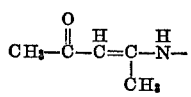  (VIII)

The compounds of Formula I (above) which are the sodium bisulfite and methanol adducts, i.e.,

  (IX)

  (X)

respectively, are also within the scope of this invention. These sulfones are useful in reducing mortality and decreasing lesion incidence of poultry exposed to Marek's disease. In addition to the new compounds, compositions comprising the new sulfones as the active ingredient are provided.

DISCUSSION OF THE PRIOR ART

Derivatives of diamino-diphenylsulfone have been described in the literature for many years; see E. H. Northey, Sulfonamides, A.C.S. monograph No. 106 (New York, 1948).

SUMMARY OF THE INVENTION

This invention provides new substituted diphenyl sulfones of the following formula:

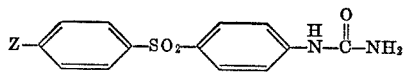

wherein Z is a substituted amino moiety having the following structure:

  (I)

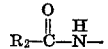  (II)

wherein $R_1$ is a phenyl group, optionally substituted with chloro, hydroxy and loweralkoxy, or hydroxy and chloro, or with a 3,4-methylenedioxy substituent; or a heterocyclic 5–6 membered ring containing one hetero atom selected from the group consisting of O, N, or S; $R_2$ is cycloalkyl having 3–6 carbon atoms, trifluoromethyl, chloromethyl, a heterocyclic 5–6 membered ring containing one hetero atom selected from the group consisting of O or N, or an aminohydrocarbyl fragment selected from the group consisting of aminomethyl, 1-amino-2-phenylethyl, and Z is also

  (III)

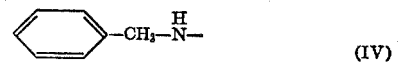  (IV)

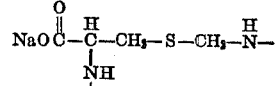  (V)

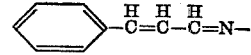  (VI)

  (VII)

or

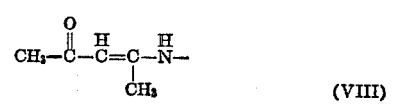  (VIII)

The compounds of Formula I (above) which are the sodium bisulfite and methanol adducts, i.e., having the following probable structures:

  (IX)

and

  (X)

respectively, are also within the scope of this invention.

In addition, diphenyl sulfones having halogen, such as chloro, fluoro, iodo, or bromo, or amino, lower alkyl, or loweralkoxy in one of the phenyl rings are also active compounds covered within the scope of this invention.

Marek's disease is a highly infectious lymphoproliferative disorder of poultry, especially chickens. Marek's disease has also been known as neural leukosis, neuralymphomatosis, acute avian leukosis, and skin leukosis. The causative agent(s) are viral with a cell associated Herpes-type virus definitely implicated as an etiological factor. Marek's disease usually is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are non-necrotic and include one or more of the following: lymphocytic infiltrated peripheral nerves and/or feather follicles, lymphoproliferative foci, microscopic to several mm. in size, within any tissue of the body but principally within the liver, spleen, kidney, gonads, heart, procentriculus, breast muscle, skin, and nerves.

Marek's disease is estimated by the U.S. Department of Agriculture to cause $200 million annual loss to the U.S. poultry industry. This loss is due to mortality and to the rejection of slaughtered bird carcasses as being unfit for human consumption. This rejection is due to the presence of the lymphoproliferative foci.

OBJECTS OF THE INVENTION

It is an object of this invention to provide novel diphenyl sulfone compounds which have utility as agents useful in the treatment of poultry exposed to Marek's disease. It is a further object of this invention to provide a composition, which when administered orally to poultry, reduces mortality and decreases lesion incidence of poultry exposed to Marek's disease. It is a further object of this invention to provide a composition containing a specific level of novel diphenyl sulfone compounds which accomplishes the positive relief without adverse effects of residue or toxicity. It is a still further object of this invention to provide a composition containing novel diphenyl sulfone compounds which promote the growth of poultry when orally administered. It is yet another object of this invention to provide a new veterinary use for novel diphenyl sulfone compounds as a growth promotant of poultry. Other objects of the invention will be apparent upon further reading.

PREFERRED ASPECTS OF THE INVENTION

The preferred novel compounds of this invention are those in which Z is

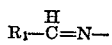

More preferably, Z is

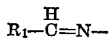

when $R_1$ is a heterocyclic 5-6 membered ring having one hetero atom selected from the group consisting of O, N, or S. It is readily seen that $R_1$ is preferably a pyrrolyl-, pyridinyl-, furanyl-, pyranyl-, thienyl-, or thiapyranyl- radical. The optimal compounds are those in which $R_1$ is pyridinyl-, or thienyl-. Another preferred compound is that in which $R_1$ is furanyl-.

Another group of preferred compounds of this invention are those in which $R_1$ is a phenyl group, or a substituted phenyl group, the substituent(s) on the phenyl group being chloro-, or hydroxy and loweralkoxy, or chloro and hydroxy. These substituent(s) can be located anywhere on the phenyl moiety. The most preferred $R_1$ is a phenyl substituted with hydroxy and loweralkoxyl. By the term "loweralkoxy" is meant a group having 1–6 carbon atoms. The most preferable loweralkoxy group is methoxy. The optimal compound is 4-(2-hydroxy-3-methoxybenzilidene)-4'-ureido - diphenyl sulfone,
4-(3-methoxy-4-hydroxybenzilidene)-4' - ureido-diphenyl sulfone, or
4-(2-chlorobenzilidene)-4'-ureido-diphenyl sulfone.

As discussed above, the sodium bisulfite or methanol adducts of the compounds where Z is

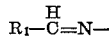

are included within the scope of this invention. Particularly, preferred adducts are those of the compounds listed above. For instance, preferred compounds are 4-(1-methoxypyridinylidene)-4'-ureido-diphenyl sulfone,
4-[1-(sodium sulfite)-pyranylidene]-4'-ureido - diphenyl sulfone,
4-[1-(sodium sulfite)-furanylidene] - 4' - ureido-diphenyl sulfone,
4-[1-(sodium sulfite)-benzilidene]-4'-ureido-diphenyl sulfone, and
4-(1-methoxy-2-chlorobenzilidene)-4' - ureido - diphenyl sulfone.

Another preferred compound when Z is

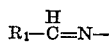

is that in which $R_1$ is a phenyl group having a methylenedioxy substituent at 3,4. This compound, and the sodium sulfite and methanol adducts, are useful also against Marek's disease.

Another group of preferred compounds of this invention are those in which Z is

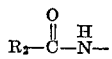

Most preferably, $R_2$ is a trifluoromethyl group. The optimal compound is 4-trifluoroacetamido-4'-ureido-diphenyl sulfone.

Yet another group of preferred compounds when Z is

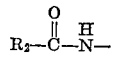

are those in which $R_2$ is a cycloalkyl group having 3–6 carbon atoms. Included are the cyclopropyl, cyclobutyl, cyclopentyl, and cyclohexyl moieties. The most preferred compounds are those in which the cycloalkyl group is cyclohexyl or cyclobutyl.

Another compound that is preferred when Z is

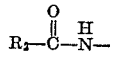

is that in which $R_2$ is chloromethyl-; this compound is known as 4-chloroacetamido-4'-ureido-diphenyl sulfone. $R_2$ can also be a haloloweralkyl group, wherein loweralkyl has 1–6 carbon atoms.

Still another group of preferred compounds when Z is

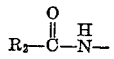

are those in which $R_2$ is a heterocyclic 5–6 membered ring containing one hetero atom. The hetero atom is O or N. Preferred heterocyclic moieties are, for example, furan, pyrrole, pyran, and pyridine. Most preferred is 4-furoylamino-4'-ureido-diphenyl sulfone. Another compound is 4-pyridinoylamino-4'-ureido-diphenyl sulfone.

Yet another preferred compounds in this series, where Z is

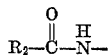

are those in which $R_2$ is an aminohydrocarbyl fragment selected from the group consisting of aminomethyl, 1-amino-2-phenylethyl, and 1-amino-2-carboxyethyl. Another preferred compound is that in which $R_2$ is 2-carboxyethyl.

Another preferred compound of this invention is that in which Z is

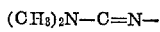    (III)

or

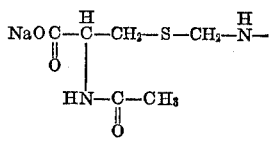    (V)

Z can also be

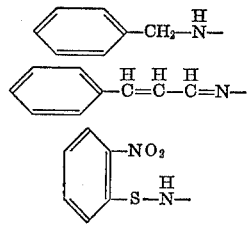    (IV)

(VI)

(VII)

or

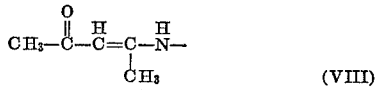    (VIII)

It is apparent that soluble non-toxic salts and alcoholate solvates of all of the above compounds are also included within the scope of the invention.

The novel diphenyl sulfones of this invention are generally prepared by a condensation reaction of 4-(sulfanilyl) phenyl urea with an appropriate reactant.

To prepare compounds of the type when Z is

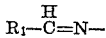

an aldehyde having the formula $R_1CHO$ is employed. The reactants are used in approximately equimolar quantities and mixed in a suitable organic solvent, such as ethanol, methanol, propyl alcohol, isobutyl alcohol, and others. Generally, any polar organic solvent which will not participate in the reaction is preferred. The reactants are mixed with slight heating, i.e., from 30–150° C., preferably from 30–100° C., for from ½–20 hours. The crude product is collected as a precipitate and purified.

When Z is

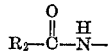

the corresponding

-halide preferably chloride, is used. This reactant can generally be described as the acid halide or chloride, and the corresponding acid anhydride is also suitable.

Whether the acid halide or acid anhydride is used, these reactants are each employed in approximately equimolar quantities with the sulfaguanidine. A solvent is employed, for instance, acetone, N,N-dimethylformamide, pyridine, trifluoroacetic anhydride and others. The temperature of the reaction can be from ambient to 150° C. and is preferably at room temperature to 90° C. The product can generally be recovered as a solid precipitate, or by evaporation of the solvent. The reaction goes to completion within 30 minutes to 20 hours.

The compounds when Z is chosen from one of the moieties III through VIII are prepared generally as discussed above, using an appropriate reactant. For instance, the compound 4 - (2 - nitrophenylsulfenyl) - 4'-ureido-diphenyl sulfone, when Z is substituent VII, is prepared by reacting 2-nitrophenylsulfenylchloride with 4-(sulfanilyl) phenyl urea.

The compound 4-(1-methyl-1,2-butenyl-3-one)-amino-4'-ureido-diphenyl sulfone, when Z is substituent VIII, is prepared by reacting 4-(sulfanilyl)phenyl urea with 2,4-pentanedione. An optional solvent such as methanol, ethanol, or tetrahydrofuran is employed. The reaction can also be conducted in an excess of the 2,4-pentanedione. An acidic catalyst, such as toluenesulfonic acid or 2,4-dinitrobenzene sulfonic acid, can also be employed if desired. The reactants are heated at room temperature at 100° C. for 2–15 hours.

The compound, 4-(dimethylaminomethyleneamino)-4'-ureido-diphenyl sulfone, when Z is substituent III, is prepared by acid hydrolysis of N'-dimethylaminomethylene - $N^3$-[4 - (p-dimethylaminomethyleneaminosulfonyl) phenyl] urea. The latter compound is obtained by reacting dimethylformamide and p-sulfanilylphenyl urea in the presence of phosphorus oxychloride.

The compound, 4 - benzylamino - 4' - ureido-diphenyl sulfone, when Z is substituent IV, is prepared by first reacting dibenzylphosphite and N-bromosuccinamide and then adding this reaction product to 4-(sulfanilyl)phenyl urea in an organic solvent. The reactions all proceed at room temperature.

The compound, 4 - ($\beta$-carboxy-$\beta$-acetylaminoethylthiomethylamino) - 4'-ureido-diphenyl sulfone, sodium salt, when Z is substituent V, is prepared by reacting cysteine and 4-((sulfanilyl)phenyl urea in the presence of formaldehyde following the same general condensation process conditions.

The compound, 4 - cinnamylidene-4'-ureido-diphenyl sulfone, when Z is substituent VI, is prepared as are the Schiff's base-type compounds by the reaction of cinnamic aldehyde and 4-(sulfanilyl)phenyl urea.

When the final sulfone contains a ring substituent, the process used is most conveniently a condensation of the appropriately substituted sulfanilyl halide with 1,4-diaminobenzene or unsubstituted sulfanilyl halide with an appropriately substituted 1,4-diaminobenzene. The exact choice of reactant will depend upon the desired position and identity of the final ring substituent. If the chosen ring substituent is fluoro, it can be conveniently substituted on the diphenyl sulfone nucleus directly by photofluorination. The reagent is a fluoroxyperfluoroalkane or fluoroxypentafluorosulfin, which is treated in combination with the diphenyl sulfone substrate under the influence of a free radical initiator. Ultraviolet irradiation is one preferred means of initiating free radicals. This photofluorination reaction process does not form part of this invention but is an invention of Dr. Janos Kollonitsch and is claimed in a copending application, U.S. Ser. No. 154,695, filed June 8, 1971 which is a continuation-in-part application of U.S. Ser. No. 60,645, filed Aug. 3, 1970, now abandoned.

It will be obvious to one skilled in the art that any of the processes described above may require manipulations such as blocking and deblocking to prevent undesirable side reactions. The exact choice of reaction, however, is deemed to be within the skill of those in the art.

Novel diphenyl sulfones of the type disclosed above are effective in the treatment and control of Marek's disease. The compounds' effectiveness is tested in vivo by employing chickens which have been infected with virus containing lymphoblasts originally obtained from a chicken with a typical case of Marek's disease. The test procedure is as follows: Athens-Canadian (A-C) random bred chicks, in groups of five each, were placed in cages with wire floors. They were fed ad libitum a standard poultry ration in which concentrations of the sulfones were blended just prior to use. Normal and infected control birds were fed basal ration containing no test compound. After 24 hours on medication, the chicks were injected with a challenge inoculum of Marek's disease virus. The inoculate was originally obtained from a typical field case of Marek's disease in commercial broilers. The inoculate characteristically produces lymphoid tumors of the liver, spleen, kidney, and gonads.

The oral medication in the feed is continued throughout the experiment as a stated percentage of the diet. After an appropriate experimental period, wherein over 50% of the non-medicated infected controls succumb, all surviving birds are sacrificed. All dead and sacrificed birds are autopsied and lesion incidence recorded.

In accordance with this invention, the novel diphenyl sulfones are employed for controlling Marek's disease by administering them to poultry susceptible or exposed to the disease, either in the drinking water, feed, or parenterally. The preferable mode of administration is orally, either in the drinking water or feed.

It is most preferred to disperse the diphenyl sulfone in the finished feed of the animals, and to administer the medicated feed ad libitum to the birds. Good results against Marek's disease are achieved with feedstuff containing from about 0.002% to 0.1% by weight of the drug. Drug levels can also operably be from 0.0002% to 0.2% in the feed. The preferred range is between 0.01% to 0.1% in the feed. Levels in poultry feed are here expressed in terms of percent by weight concentration.

The higher levels may be used in treating an established outbreak of Marek's disease, but the higher dosages are not preferred for prophylactic treatment where medicated feed is given continuously to the poultry. It will be appreciated by those skilled in this art that these low levels will eliminate any toxicity or residue problems which result from feeding of high levels of the diphenyl sulfone.

The finished feed in which the above-described levels of the novel diphenyl sulfones are employed is a nutritionally adequate one containing sources of carbohydrate, protein, fat, vitamins, minerals and other nutritional factors commonly employed in commercial poultry raising. In addition, other poultry feed additives such as coccidiostats, e.g., amprolium, ethopabate, nicarbazin, can be employed in the compositions.

In addition to administration via the solid feedstuff, diphenyl sulfones can be administered to poultry by incorporation in the drinking water. The preferred dose levels in the drinking water are usually somewhat less than those employed in a solid feed inasmuch as poultry drink about twice as much as they eat. The operable level in drinking water is from 0.0001% to 0.1% by weight of the diphenyl sulfone compound and the preferred range is 0.005% to 0.1% by weight. Administration via the drinking water is of advantage when using the compound therapeutically rather than prophylactically. For this purpose it is convenient to prepare dispersible or water-soluble powders in which the diphenyl sulfones are intimately dispersed in a suitable water-soluble or dispersible liquid or solid carrier such as dextrose, sucrose, dimethyl sulfoxide, or other suitable non-toxic carriers, at concentrations of from about 0.03% to about 25% by weight. These solids may then be conveniently added to the drinking water by the poultry grower.

A typical drinking water formulation contains 4-thienylidene-2)-4'-(ureido-diphenyl sulfone, 0.3%; 1-(2-n-propyl-4-amino-5-pyrimidinyl - methyl)-2-methyl pyridinium chloride hydrochloride, 9.6% dextrose, 30%; propylene glycol, 20%; dimethylpolysiloxane, 0.002% polyoxyethylene sorbitan monoleate, 0.2%; water, to 100%.

According to a further aspect of this invention, there are provided compositions comprising poultry feed supplements or additives containing the diphenyl sulfones previously described as an effective Marek's disease agent. In such compositions the compound is mixed with or dispersed in an orally ingestible carrier vehicle that is non-toxic to the poultry and compatible with the finished feedstuff. These feed supplements contain a significantly higher percentage of the novel diphenyl sulfone compounds than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adequate mixing. The diphenyl sulfones described hereinabove may be formulated into feed supplement compositions containing from about 0.05% to about 50% by weight of drug. It is preferred in the industry to use from about 1–5 pounds of such a supplement per ton of feedstuff. It will, therefore, be appreciated than the preferred supplement concentration will depend to a large extent on the final use level desired. With the compounds of this invention, feed supplement compositions containing from about 1.0% to about 20% by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

It will be apparent to one skilled in the art that when we use the term "substituted diphenyl sulfone" we mean compounds which can also be named as derivatives of 4-(sulfanilyl)phenyl urea. The "sulfanilyl" portion of the molecule is

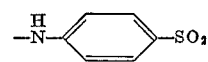

and the phenyl and urea portions are self-explanatory. When the latter system of nomenclature is used, the novel compounds of this invention are named as the N-substituents. For instance, the compound described in Example 1, 4-(furanylidene-2)-4'-ureido-diphenyl sulfone can also be named 4-[N-(furanylidene-2)-sulfanilyl]phenyl urea. The other compounds can be named accordingly.

This invention will be more fully described in the following examples.

EXAMPLE 1

4-(furanylidene-2)-4'-ureido-diphenyl sulfone 1.5 g. of furan-2-carboxaldehyde is dissolved in 50 ml. of ethanol and 2.1 g. of 4-(sulfanilyl)phenyl urea is added. The solution is boiled to concentration to a volume of 15 ml., then cooled. A precipitate forms during the concentration and is collected and washed with ethanol. Recrystallization of the solid from 40 ml. of methanol yields the product, 4-(furanylidene-2)-4'-ureidodiphenyl sulfone, M.P. 188–190° C.

EXAMPLE 2

4-(thenylidene-2)-4'-ureido-diphenyl sulfone

A 1.2 g. portion of thiophene-2-carboxaldehyde is dissolved in 50 ml. of ethanol and 2.00 g. of 4-(sulfanilyl) phenyl urea is added. The solution is boiled down to 15 ml. and cooled. The resultant precipitate is collected; washed with hot ethanol. Recrystallization from 35 ml. of methanol gives the product, 4-(thenylidene-2)-4'-ureido-diphenyl sulfone, M.P. 220–222° C.

EXAMPLE 3

4-(pyrrolylidene-3)-4'-ureido-diphenyl sulfone

Using the same procedure of Examples 1 and 2, pyrrole-3-carboxaldehyde is reacted with 4-(sulfanilyl)phenyl urea. The product, 4-(pyrrolidene-3)-4'-ureido-diphenyl sulfone is recovered.

cedures of Example 1 or 2. Examples 18 through 20 are the methanol adducts of the indicated products and are prepared following the procedure of Example 4.

These compounds were all identified by use of nuclear magnetic resonance techniques. Melting points of the indicated compounds were not obtainable, due to the decomposition of the compound under heat.

TABLE I.—EXAMPLES 7-20

| Example No. | Product obtained | Starting aldehyde | M.P. o product (° C.) |
|---|---|---|---|
| 7 | 4-(furanylidene-2)-4'-ureido-diphenyl sulfone, NaHSO₃ adduct | Furan-2-carboxaldehyde | (1) |
| 8 | 4-(benzilidene)-4'-ureido-diphenyl sulfone | Benzaldehyde | 223-225.5 |
| 9 | 4-(benzilidene)-4'-ureido-diphenyl sulfone, NaHSO₃ adduct | do | (1) |
| 10 | 4-(2-hydroxy-3-methoxy benzilidene)-4'-ureido-diphenyl sulfone | 2-OH-3-OCH₃-benzaldehyde | 210-212 |
| 11 | 4-(2-hydroxy-5-chlorobenzilidene)-4'-ureido-diphenyl sulfone | 2-OH-5-Cl-benzaldehyde | 201-204 |
| 12 | 4-(4-chlorobenzilidene)-4'-ureido-diphenyl sulfone | 4-Cl-benzaldehyde | ² 103-110 |
| 13 | 4-(3,4-methylenedioxybenzilidene)-4'-ureido-diphenyl sulfone | 3,4-methylenedioxybenzaldehyde | 231-233 |
| 14 | 4-(2-chlorobenzilidene)-4'-ureido-diphenyl sulfone, NaHSO₃ adduct | 2-Cl-benzaldehyde | (1) |
| 15 | 4-(3-methoxy-4-hydroxybenzilidene)-4'-ureido-diphenyl sulfone, NaHSO₃ adduct | 3-OCH₃-4-OH-benzaldehyde | (1) |
| 16 | 4-(3,4-methylenedioxybenzilidene)-4'-ureido-diphenyl sulfone, NaHSO₃ adduct | 3,4-methylenedioxybenzaldehyde | (1) |
| 17 | 4-(2-hydroxy-3-methoxybenzilidene)-4'-ureido-diphenyl sulfone, NaHSO₃ adduct | 2-OH-3-OCH₃-benzaldehyde | (1) |
| 18 | 4-(benzilidene)-4'-ureido-diphenyl sulfone, methanol adduct | Benzaldehyde | (1) |
| 19 | 4-(2-hydroxy-3-methoxybenzilidene)-4'-ureido-diphenyl sulfone, methanol adduct | 2-OH-3-OCH₃-benzaldehyde | (1) |
| 20 | 4-(2-hydroxy-4-chlorobenzilidene)-4'-ureido-diphenyl sulfone, methanol adduct | 2-OH-4-Cl-benzaldehyde | (1) |

¹ Not obtainable.  ² Dec.

EXAMPLE 4

4-(pyridinylidene-2)-4'-ureido-diphenyl sulfone, methanol adduct 2.0 g. of pyridine-2-carboxaldehyde is dissolved in 75 ml. of ethanol and 2.9 g. of 4-(sulfanilyl)phenyl urea is added. After concentrating the solution to 15 ml., a precipitate forms and is collected. This precipitate is washed with ethanol and then dissolved in 50 ml. of methanol. Evaporation of the methanol yields the solid product, 4-(pyridinylidene-2)-4'-ureido-diphenyl sulfone, methanol adduct, identified by nuclear magnetic resonance (NMR). The adduct decomposed while being heated, so that no melting point could be obtained.

EXAMPLE 5

4-(pyranylidene-3)-4'-ureido-diphenyl sulfone, methanol adduct

Using the procedure of Example 4, pyran-3-carboxaldehyde is reacted with 4-(sulfanilyl)phenyl urea. The product, 4-(pyranylidene-3)-4'-ureido-diphenyl sulfone, methanol adduct is recovered.

EXAMPLE 6

4-(thenylidene-2)-4'-ureido-diphenyl sulfone, sodium bisulfite adduct 8.0 millimoles of thiophene-2-carboxaldehyde and 5 millimoles of NaHSO₃ are heated with 5 millimoles of 4-(sulfanilyl)phenyl urea in 10 ml. of water on a steam bath for 10 minutes. During this time, an additional 5.0 millimoles of thiophene-2-carboxaldehyde is added. The mixture is then cooled and insolubles are removed by filtration. The filtrate is concentrated to a solid by freezing and then drying under vacuum ("freeze-drying"). Purification is achieved by dissolving in methanol and reprecipitating with ether. The product, 4-(thenylidene-2)-4'-ureido-diphenyl sulfone, sodium bisulfite adduct is recovered having a melting point of 117° C., dec. The compound is fully identified by means of NMR techniques.

EXAMPLES 7-20

The following Examples 7-20 are summarized and tabulated in Table I. Examples 7, 9, and 14 through 17 are the sodium bisulfite adducts of the indicated products and are prepared following the procedure of Example 6. Examples 8 and 10 through 13 are the unsubstituted Schiff base-type compounds prepared following the procedures of Example 1 or 2. Examples 18 through 20 are the methanol adducts of the indicated products and are prepared following the procedure of Example 4.

EXAMPLE 21

4-trifluoroacetamido-4'-ureido-diphenyl sulfone

A suspension of 2.9 g. (10 mmoles) of 4-(sulfanilyl)-phenyl urea in 20 ml. of trifluoroacetic anhydride is stirred overnight at room temperature. The precipitated solid is removed by filtration at the end of the reaction, washed with ether, and recrystallized from methanol-water to give the product, 4-trifluoroacetamido-4'-ureido-diphenyl sulfone, M.P. 180° C. (softening and decomposition) —200° C. (all melted).

EXAMPLE 22

4-chloroacetamido-4'-ureido-diphenyl sulfone

To a suspension of 11.6 g. of 4-(sulfanilyl) phenyl urea in 200 ml. of water containing 2 g. of sodium hydroxide, is added 25 ml. of chloroacetylchloride. The reaction mixture is stirred at room temperature for one hour at which time thin layer chromatography shows no presence of the starting material. The product is recovered from the reaction mixture by filtration and purified by recrystallization in methanol-water. The product, 4-chloroacetamido-4'-ureido-diphenyl sulfone, is recovered as the hemihydrate, M.P. 195–197° C., dec.

EXAMPLE 23

4-cyclohexanoylamino-4'-ureido-diphenyl sulfone

To a warm solution of 2.91 g. of 4-(sulfanilyl)phenyl urea in 10 ml. of pyridine is added 1.11 g. of cyclohexanecarbonyl chloride. The mixture is heated on a steam bath for 15 hours and an additional 1.1 g. of the chloride is added. After 5 more minutes of warming, the mixture is cooled and diluted with 140 ml. of water. A viscous oil is separated. The supernatant is decanted and replaced with more water. After stirring overnight, the oil is solidified and is collected on a filter. The solid is dissolved in 100 ml. of acetone, the solution is filtered to remove insolubles, and concentrated to 50 ml. The solution is then cooled. A precipitate is recovered which is pure by thin layer chromatography analysis. The product, 4-cyclohexanoylamino-4'-ureido-diphenyl sulfone is identified by NMR, M.P. 140–145° C.

EXAMPLE 24

4-cyclobutanoylamino-4'-ureido-diphenyl sulfone

Using the same process as described in Example 23, 4-(sulfanilyl)phenyl urea and cyclobutanecarbonyl chloride are reacted. The product, 4-cyclobutanoylamino-4'-ureido-diphenyl sulfone, has a melting point of 100° C. with decomposition. The product was identified using NMR.

EXAMPLE 25

4-furoylamino-4'-ureido-diphenyl sulfone

A 2.0 g. portion of 4-(sulfanilyl)phenyl urea is dissolved in 10 ml. of pyridine and 0.99 g. of furoyl chloride is added. The mixture is heated in a steam bath for 15 hours. After cooling, 140 ml. of water is added. A dark oil separates which solidifies on standing to give 2.65 g. of solid. This material is then dissolved in 20 ml. of methanol and the solution is filtered. Water is added until cloudiness is obtained, and the mixture is concentrated by heating under a stream of nitrogen. The residue, after purification, yielded the product, 4-furoylamino-4'-ureido-diphenyl sulfone, M.P. 138–145° C.

EXAMPLE 26

4-nicotinoylamino-4'-ureido-diphenyl sulfone

A 2.00 g. portion of 4-(sulfanilyl)phenyl urea is dissolved in 8 ml. of pyridine and 1.71 g. of nicotinoyl chloride hydrochloride is added. The mixture is warmed on a steam bath for 5 minutes. After cooling, 25 ml. of water is added slowly and the resultant precipitate is collected on a filter. After washing successively with water and hot methanol, 1.20 g. of product, 4-nicotinoylamino-4' - ureido-diphenyl sulfone, is obtained, M.P. 220–221.5° C.

EXAMPLE 27

4-pyrroyl-4'-ureido-diphenyl sulfone

Using the same process as in Example 26, 4-(sulfanilyl) phenyl urea and pyrroyl chloride are reacted. The product, 4-pyrroyl-4'-ureido-diphenyl sulfone, is recovered.

EXAMPLE 28

4-pyranoyl-4'-ureido-diphenyl sulfone

Using the same process as in Example 26, 4-(sulfanilyl)phenyl urea and pyranoyl chloride are reacted. The product, 4-pyranoyl-4'-ureido-diphenyl sulfone is recovered.

EXAMPLE 29

4-aminomethylcarbonylamino-4'-ureido-diphenyl sulfone

The amide prepared in Example 22, 4-chloroacetamido-4'-ureido-diphenyl sulfone (5 g.) is dissolved in 250 ml. of concentrated ammonium hydroxide and 250 ml. of ethanol and heated at reflux for 2.5 hours. The ethanol is then removed by evaporation at reduced pressure. The residue is a semi-solid mass which is not filterable. After drying, a solid product is obtained which is then washed with water. The final product, 4-aminoethylcarbonylamino-4'-ureido-diphenyl sulfone, M.P. 240–245° dec., is analyzed and identified as the hydrate form.

EXAMPLE 30

4-(α-amino-β-phenylpropionylamino)-4'-ureido-diphenyl sulfone

To 2.91 g. of 4-(sulfanilyl)phenyl urea dissolved in 20 ml. of dry pyridine is added with stirring 3.2 g. of phthalyl-L-phenylalanylchloride [J.A.C.S., 74, 38–2 (1952)]. A crystalline product begins to form after a few minutes. After a few hours, water is added to complete crystallization. The crude product is collected on a filter and washed well with water to yield 4.51 g. A portion crystallized from methanol has a melting point of 170–175° dec. This product is identified as the intermediate: 4-[4-(phthalyl - L - phenylalanylamino)phenylsulfonyl]phenyl urea.

A mixture of 1.14 g. (0.002 mole) of 4-[4'-(phthalyl-L - phenylalanylamino)phenylsulfonyl]phenyl urea and 0.15 g. (0.003 mole) of hydrazine hydrate in 20 ml. of ethanol is heated at reflux temperature for 3 hours. The reaction mixture is concentrated under reduced pressure to leave a solid residue. It is then extracted with 10% potassium hydroxide solution to remove phthalylhydrazide, a by-product of the reaction. The alkali-insoluble material is washed with water and ethanol and dried, yield 0.79 g. A 0.26 g. sample is crystallized from dimethyl sulfoxide and water. There is obtained 0.13 g., M.P. 235–240° (dec.), of the product, 4-(α-amino-β-phenylpropionylamino)-4'-ureido-diphenyl sulfone. Thin-layer chromatography indicates a single component. Analytical data as well as NMR and IR spectra are consistent for the assigned structure.

EXAMPLE 31

4-aspartylamino-4'-ureido-diphenyl sulfone

A 5.82 gram portion of 4-(sulfanilyl)phenyl urea is dissolved in 50 ml. of dimethylformamide, the solution is cooled with an ice bath and 4.12 grams of dicyclohexylcarbodiimide is added. The mixture is cooled and stirred, and a solution of 6.22 grams of t-butyl-L-aspartic-4-benzyl ester in 50 ml. of ethylacetate is added in two minutes. After stirring 15 hours under a nitrogen atmosphere, the insoluble precipitate is removed by filtration and the filtrate is concentrated in vacuo to ~30 ml. volume, which is washed with 100 ml. of ether. The residual gum is extracted with 100 ml. of chloroform. The chloroform-soluble material is chromatographed in 150 grams of silica gel, yielding 1.2 grams of 4-[N-(o-benzyl-5 - butoxycarbonylamineaspartyl)sulfanilyl]phenyl urea, which was pure by TLC but contained residual chloroform, M.P. ~95–115° C.

A 800 mg. portion of 4-[N-(o-benzyl-t-butoxycarbonylamineaspartyl)sulfanilyl]phenyl urea is hydrogenated in 40 ml. of ethanol in the presence of 80 mg. of a catalyst (10% palladium in carbon) at atmospheric pressure. Removal of the catalyst by filtration and concentration of the filtrate under a stream of nitrogen gives a residue which crystallizes on trituration with ether to give 4-[N-(t-butyloxycarbonylaspartyl)sulfanilyl]phenyl urea, which is pure by TLC and NMR, but contains ether as a solvent, M.P. ~150–170° C.

A 420 mg. portion of 4-[N-(t-butyloxycarbonylaspartyl)sulfanilyl]phenyl urea is dissolved in 5 ml. of dimethoxyethane, and the solution is cooled in an ice bath before being saturated with hydrogen chloride gas. After standing 15 hours at room temperature, the solvent is removed in vacuo and triturated with ether to give 0.29 gram of 4-aspartylamino-4'-uredio-diphenyl sulfone hydrochloride which is pure by TLC and NMR, but contains solvent, M.P. ~75° C.

EXAMPLE 32

4-(β-carboxypropioinylamino)-4'-ureido-diphenyl sulfone

A mixture of 2.9 grams of 4-(sulfanilyl)phenyl urea, 1.0 gram of succinic anhydride, and 60 ml. of methylethyl ketone is heated at reflux for 17 hours. After cooling, the crystalline product is filtered and washed with methylethyl ketone and with ether. Yield: 2.9 grams of sample, recrystallized from methanol-ether, M.P. 145–150° C. dec. Analysis shows the material to be the hemihydrate of 4-(β-carboxypropionylamino)-4'-ureido-diphenyl sulfone. The material is homogeneous by thin-layer chromatography (TLC) and shows an NMR spectrum consistent with the above structural formula.

EXAMPLE 33

4-(dimethylaminomethyleneamino)-4'-uredio-diphenyl sulfone

To 20 ml. of dry dimethylformamide in an ice bath is added 2.56 ml. of phosphorous oxychloride during five minutes. To the resulting solution is added 4.0 g. of p-sulfanilylphenyl urea which dissolves immediately. A precipitate subsequently forms and after two hours at room temperature, the solid is removed by filtration and washed with dimethylformamide and with ether. This solid is taken up in 100 ml. of cold water, the solution filtered, and the filtrate brought to pH 8 with aqueous sodium hydroxide. The product is filtered, washed with water, and dried in vacuo. Yield of the intermediate N'-dimethylaminomethylene - $N^2$-[p - (dimethylaminomethylenesulfanilyl)phenyl]urea is 3.85 g., M.P. (from methanol) 200–201° C. Analysis, NMR, and infra-red spectra are consistent with the assigned structure.

A mixture of 300 mg. of N'-dimethylaminomethylene-$N^3$ - [4 - (p - dimethylaminomethyleneaminophenylsulfanilyl)phenyl]urea and 3.0 ml. of 2.5 N hydrochloric acid is heated at about 95° C. (steambath) for 20 minutes. The mixture is cooled, filtered, and the crystalline product washed with cold 2.5 N hydrochloric acid, ethanol, and with ether to yield 250 mg. A sample is recrystallized from methanol for analysis, and indicates that the product is 4-(dimethylaminomethyleneamino)-4'-ureido-diphenyl sulfone. The material is homogeneous by TLC and shows an NMR spectrum consistent with the structure.

EXAMPLE 34

4-($\beta$-carboxy-$\beta$-acetylaminoethylthiomethylamino)-4'-ureido-diphenyl sulfone, sodium salt, dihydrate To 2.91 g. (0.01 mole) of 4-(sulfanilyl)phenyl urea suspended in 33 ml. of ethanol are added 1.5 ml. of 36% formaldehyde solution, 1.8 g. (0.011 mole) of N-acetyl-L-cysteine and three drops of concentrated hydrochloric acid. After 2½ hours, some oily sticky material separates. The reaction mixture is filtered through sintered glass. To the filtrate is added a solution of sodium ethoxide in ethanol until precipitation ceases. At this point, the supernatant liquid has a basic pH. The precipitated product is collected and washed well with ethanol and ether. After drying in vacuo over potassium hydroxide, the material weighs 2.66 g., M.P. 205–210° (dec.). Thin-layer chromatography indicates a single component, and analysis shows a dihydrate. The compound is identified as 4-($\beta$-carboxy-$\beta$-acetylaminoethylthiomethylamino)-4'-ureido-diphenyl sulfone, sodium salt dihydrate, and NMR and IR spectra are consistent with this structure.

EXAMPLE 35

4-benzylamino-4-ureido-diphenyl sulfone 6.0 grams of dibenzylphosphite is added to 50 ml. of benzene and 3.2 grams of N-bromosuccinamide. After one hour, insoluble material is removed by filtration, and the filtrate is concentrated in vacuo to an oil which is dissolved in 30 ml. of carbon tetrachloride. This solution is added dropwise to a stirred mixture of 2.91 grams of 4-(sulfanilyl)phenyl urea and 100 ml. of benzene. After stirring 2½ days, a brown gum is collected and extracted with 70 ml. of 4:1 chloroform:methanol. This extract is chromatographed twice on silica gel using 4:1 chloroform:methanol as an eluant. The front-running fraction yields one-half gram, which is recrystallized from methanol to give 0.25 gram of 4-benzylamino-4-ureido-diphenyl sulfone, M.P. 239–240° C.

EXAMPLE 36

4-cinnamylidene-4'-ureido-diphenyl sulfone 4.82 grams of 4-(sulfanilyl)phenyl urea is dissolved in 200 ml. of hot methanol and 4.2 grams of cinnamic aldehyde is added. The mixture is concentrated to 50 ml. and, after standing 15 hours, 3.3 g. of material is collected, which is partially recrystallized from 125 ml. of methanol to give 2.6 grams of 4-cinnamylidene-4'-ureido-diphenyl sulfone, M.P. 200–202° C.

This bis-sodium bisulfite adduct of this compound can be prepared by warming on a steam bath 2.03 g. of 4-cinnamylidene-4'-ureido-diphenyl sulfone and 1.05 g. of sodium bisulfite in 10 ml. of water. Insolubles are removed by filtration; the filtrate is dried to a residue and recrystallized from methanol/ether. The product, 4-cinnamylidene - 4' - ureido-diphenyl sulfone, bis bisulfite adduct is identified, and has a M.P. of 231–234° C.

EXAMPLE 37

4-(2-nitrophenylsulfenylamino)-4'-ureido-diphenyl sulfone

A mixture of 2.0 g. of 4-(N-sulfanilyl)phenyl urea, .71 g. of triethylamine, 1.3 g. of 2-nitrophenylsulfenyl chloride, and .73 g. of triethylamine were stirred overnight in 250 ml. of acetone. The mixture is stirred two more days with the addition of four 1.3 g. portions of 2-nitrophenylsulfenyl chloride and .71 g. of triethylamine. Insoluble material is removed by filtration and the acetone is removed in vacuo. The residue is washed with two 200 ml. portions of hot ether and then extracted with 50 ml. of acetone. The acetone extract is concentrated to a gum which is extracted with 50 ml. of chloroform. The chloroform extract is chromatographed on 100 g. of silica gel using 1% methanol in chloroform. In this manner, 300 mg. of material which is characterized by its NMR spectrum is obtained, M.P. >90° C., identified as 4-(2-nitrophenylsulfenylamino)-4'-ureido-diphenyl sulfone.

EXAMPLE 38

4-(1-methyl-1,2-butenyl-3-one)-amino-4'-ureido-diphenyl sulfone

A 2 g. portion of 4-(sulfanilyl)phenyl urea is stirred for 12 hours in 20 ml. of 2,4-pentanedione in the presence of a few mg. of 2,4-dinitrobenzene sulfonic acid. The resultant precipitate is collected on a filter and recrystallized from 35 ml. of 2,4-pentanedione to give 1.2 g. of product, 4 - (1 - methyl - 1,2-butenyl-3-one)-amino-4'-ureido-diphenyl sulfone, M.P. 204–207° C.

What is claimed is:

1. Novel diphenylsulfones which have the following structure:

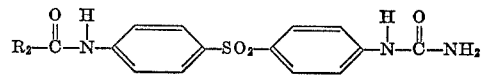

wherein $R_2$ is cycloalkyl having 3–6 carbon atoms, chloromethyl, trifluoromethyl, aminomethyl, 2-carboxyethyl, or the heterocyclic moieties 4-furan, 4-pyrrole, 4-pyran, or 4-pyridine.

2. The compound of claim 1 in which $R_2$ is trifluoromethyl.

3. The compound of claim 1 in which $R_2$ is cycloalkyl having 3–6 carbon atoms.

4. The compound of claim 3 in which $R_2$ is cyclobutyl.

5. The compound of claim 3 in which $R_2$ is cyclohexyl.

6. The compound of claim 1 in which $R_2$ is aminomethyl.

7. The compound of claim 1 in which $R_2$ is chloromethyl.

References Cited

UNITED STATES PATENTS

| | | | |
|---|---|---|---|
| 2,323,573 | 7/1943 | Shonle et al. | 260—397.6 |
| 2,328,490 | 8/1943 | Pohls | 260—397.6 |
| 2,328,548 | 9/1943 | Dohrn et al. | 260—397.6 |
| 2,351,936 | 6/1944 | Dohrn et al. | 260—397.6 |

FOREIGN PATENTS

| | | | |
|---|---|---|---|
| 491,265 | 8/1938 | England | 260—397.6 |

OTHER REFERENCES

Northey: The Sulfonamides and Allied Compounds, pp. 362–363, Reinhold Publishing Corp. (1948).

Buttle et al.: Bichem. J., vol. 32 pp. 1101–1110 (1938).

JOHN D. RANDOLPH, Primary Examiner

U.S. Cl. X.R.

260—239.8, 240 G, 397.6; 424—263, 274, 283, 322